(12) United States Patent
Schwarzer et al.

(10) Patent No.: US 7,651,067 B2
(45) Date of Patent: Jan. 26, 2010

(54) UPPER VALVE PART FOR FITTINGS

(75) Inventors: Peter Schwarzer, Lüdenscheid (DE);
Friedrich Thurau, Lüdenscheid (DE)

(73) Assignee: Flühs Drehtechnik GmbH, Lüdenscheid (DE)

( * ) Notice: Subject to any disclaimer, the term of this patent is extended or adjusted under 35 U.S.C. 154(b) by 332 days.

(21) Appl. No.: 11/360,633

(22) Filed: Feb. 23, 2006

(65) Prior Publication Data
US 2006/0186364 A1    Aug. 24, 2006

(30) Foreign Application Priority Data
Feb. 23, 2005  (DE) .................. 20 2005 002 894 U

(51) Int. Cl.
*F16K 35/00* (2006.01)
(52) U.S. Cl. .................. 251/116; 251/337; 137/625.17
(58) Field of Classification Search .............. 251/111, 251/116, 337; 137/625.17, 625.4, 625.41
See application file for complete search history.

(56) References Cited

U.S. PATENT DOCUMENTS

| 2,692,112 | A | * | 10/1954 | Szitar ........................... 251/66 |
| 3,357,677 | A | * | 12/1967 | Tasker ......................... 251/106 |
| 3,924,882 | A | * | 12/1975 | Ellis ........................ 285/148.19 |
| 4,589,439 | A | * | 5/1986 | Steingass ..................... 137/219 |
| 4,589,629 | A |   | 5/1986 | Gaffney et al. |
| 4,651,770 | A | * | 3/1987 | Denham et al. ............. 137/270 |
| 4,796,860 | A |   | 1/1989 | Diel |
| 4,821,954 | A | * | 4/1989 | Bowder ..................... 236/48 R |
| 4,899,982 | A |   | 2/1990 | Lange |
| 4,960,154 | A |   | 10/1990 | Dagiantis |
| 5,538,041 | A | * | 7/1996 | Ganzle ................. 137/625.17 |
| 5,592,971 | A |   | 1/1997 | Knapp |
| 6,908,071 | B2 | * | 6/2005 | Roethel et al. .............. 251/238 |
| 7,152,845 | B2 |   | 12/2006 | Carrez et al. |

FOREIGN PATENT DOCUMENTS

| DE | 21 34 430 | 1/1972 |
| DE | 32 07 895 | 9/1983 |
| DE | 87 15 044 | 2/1988 |
| DE | 36 38 180 | 5/1988 |
| DE | 0 309 443 | 3/1989 |
| DE | 200 08 679 | 10/2000 |
| GB | 1 425 891 | 2/1976 |
| WO | WO 2004/031635 | 4/2004 |

OTHER PUBLICATIONS

European Search Report dated Jun. 11, 2008 with English translation of same.

* cited by examiner

*Primary Examiner*—John K Fristoe, Jr.
(74) *Attorney, Agent, or Firm*—Collard & Roe, P.C.

(57) ABSTRACT

An upper valve part for fittings has a head piece through which a spindle passes, means for shut-off, and a seal that comes to rest on the fitting. A radially acting locking device is provided.

10 Claims, 13 Drawing Sheets

42

UPPER VALVE PART FOR FITTINGS

CROSS REFERENCE TO RELATED APPLICATIONS

Applicants claim priority under 35 U.S.C. §119 of German Application No. 20 2005 002 894.0 filed Feb. 23, 2005.

BACKGROUND OF THE INVENTION

1. Field of the Invention

The invention relates to an upper valve part for fittings, having a head piece through which a spindle passes, and means for shut-off, and having a seal that comes to rest on the fitting.

2. The Prior Art

The exit of media from fittings is controlled using upper valve parts. For this purpose, the upper valve part is screwed into the housing of a fitting by its head piece, and a handle or lever is set onto its spindle. In the case of known upper valve parts (see German Patent Nos. DE 32 07 895 C2, DE 36 38 180 C2, and DE 87 15 044 U1), two disks for controlling the through-flow are provided, in each instance. The disks are produced from ceramic material. One of the two disks, the control disk, is disposed to rotate in the upper valve part, using a driver that is connected with the spindle. The other disk, the inlet disk, is a fixed valve seat disk, also referred to as a fixed disk. When the control disk is rotated, the disks slide on one another. On the side facing the valve seat of the fitting, a seal is disposed, which rests against the inlet disk. The seal projects beyond the face of the upper valve part. It serves as a seal both towards the inlet disk and towards the valve seat of the fitting.

Furthermore, an upper valve part for fittings is known from German Patent No. DE 200 08 679 U1, in which shut-off is achieved in that the control disk automatically changes from its position in which it allows through-flow to its shut-off position, subsequent to a pulse. Therefore, the upper valve part allows only two activation positions, namely the position "completely open" and the position "completely closed." Activation of the upper part takes place by means of pressing on a cap, counter to a spring. In this way a blockage exerted on the handle is released. The handle can then be turned. The rotation of the handle is transferred to the spindle, thereby opening the valve. Activation into the closed position takes place in comparable manner.

The known upper valve parts fulfill all the tasks set for them. However, the design effort is quite complicated, because of the requirement of a handle that can be moved in the axial direction of the upper valve part, as well as the mechanism for shutting off the valve. As a consequence, the production of the upper valve part is complicated.

SUMMARY OF THE INVENTION

It is therefore an object of the invention to create an upper valve part for fittings that only allows the positions "completely open" and "completely closed," and thus reduces the design effort in comparison with known upper valve parts. This object is accomplished in that a locking device that acts radially is provided.

An upper valve part for fittings, which permits only two positions, namely the position "completely open" and the position "completely closed," is created with the invention. At the same time, the upper valve part is structured in a simple manner, thereby making the production costs low. Furthermore, the assembly effort for the upper valve part according to the invention is low.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
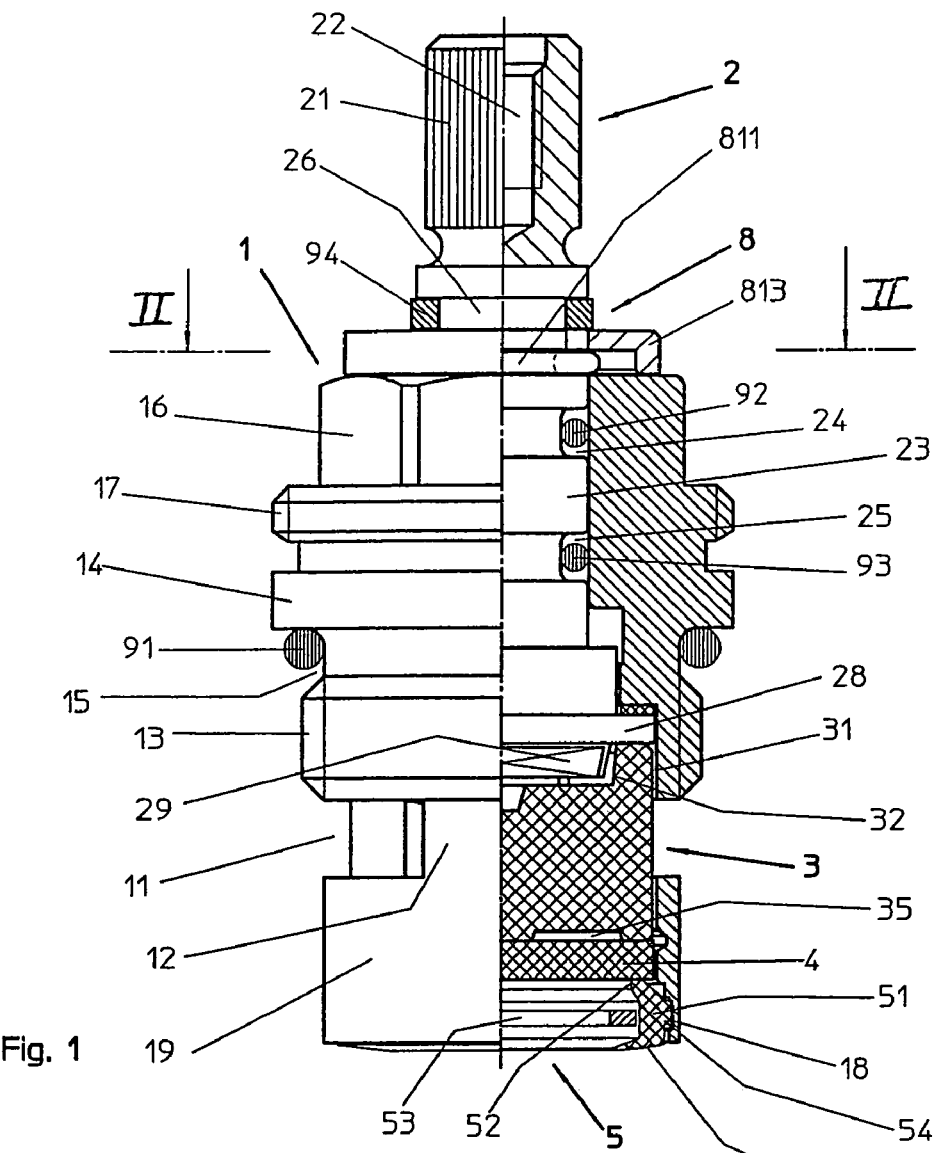
FIG. 1 shows in an enlarged representation, an upper valve part, partially in a side view, partially in axial cross-section.

Referring now in detail to the drawings, the upper valve parts selected as exemplary embodiments have a head piece 1, 10, through the center of which a spindle 2, 20, guided radially in it, passes. A control disk 3, 30 is connected with the spindle 2, 20, with a positive lock, and radially guided in the head piece 1. On the side of the control disk 3, 30 that faces away from the spindle 1, an inlet disk 4, 40 is provided on the head piece 1, 10, followed by a seal ring 5 that comes to rest on the valve seat of a fitting (not shown). In the embodiments according to FIGS. 13 to 18, the upper valve parts have a disk guide 60, in each instance, which is disposed in the head piece 10 so as not to rotate, and in which the spindle 20 is guided. Furthermore, a cap sleeve 70 is disposed around the head piece 10. All of the upper valve parts are provided with a locking device 8, in each instance.

In the following, the structure of the upper valve parts according to FIGS. 1 to 12 will be explained, using as an example the embodiment according to FIGS. 1 and 2, in combination with the FIGS. 19 to 29.

Head piece 1 consists of a symmetrical hollow body, the two faces of which are open. On the side facing the fitting, the head piece has a sleeve-like part 19. Passage windows 11 are provided in part 19, which are delimited by longitudinal crosspieces 12. Windows 11 delimited by two crosspieces 12 are provided. Following window 11, head piece 1 is provided, on the outside, with a connection thread 13. Using connection thread 13, the head piece can be screwed into the housing of the fitting.

After it has been screwed in, a screw-in collar 14 of head piece 1 rests on the housing of the fitting. Screw-in collar 14 has a ring groove 15 for accommodating an O-ring 91 on its side that faces connection thread 13. Screwing the head piece into the fitting takes place by means of an outer polygon 16 that is provided on the side of screw-in collar 14 that faces away from connection thread 13. This part of head piece 1 can be provided, as shown, with an additional outside thread 17 for accommodating a sleeve, not shown. However, this part of the head piece can also be configured towards the outside, overall, in the manner of a truncated cone that has recesses in the manner of a polygon in the region of the flange. In sleeve-like part 19, a relieved region 18 is disposed on the inside, in the region of the end that faces the valve seat. Following this, two recesses that lie diametrically opposite one another (not shown) are provided.

Spindle 2 is essentially structured to be solid. At its face that faces away from the water in-flow, it is configured as an outer polygon 21 on the outside and provided with a dead-end hole 22 with an inside thread for attaching a turning handle, not shown, on the inside. Following that, a cylinder surface 23 is provided on the outside of the spindle, with which the spindle 2 is guided radially in head piece 1. Two ring grooves 24 and 25 are provided in cylinder surface 23, which accommodate O-rings 92 and 93. O-rings 92 and 93 seal spindle 2 off from head piece 1. A recess 26 is provided between cylinder surface 23 and the outer polygon 21, into which a shaft securing device 94 in the form of a split ring is laid in resilient manner. Shaft securing device 94 prevents penetration of the spindle into head piece 1, beyond the measure intended.

Spindle 2 can rotate in head piece 1. On the side opposite outer polygon 21, a disk 28 is provided, which has a driver 29 on its side facing the fitting.

Figure 19:
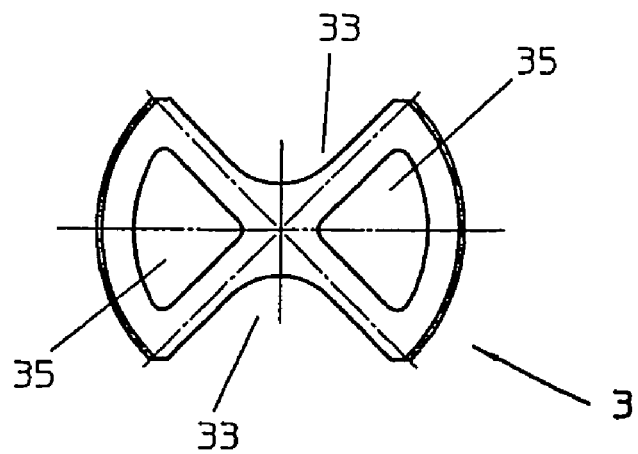
FIG. 19 shows a bottom view of a control disk.
Figure 20:
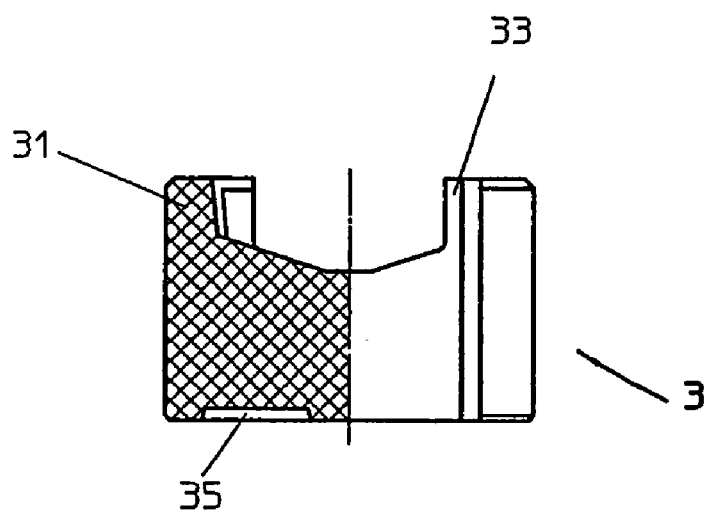
FIG. 20 shows a representation of a control disk, partially in a side view, partially in axial cross-section.
Figure 21:
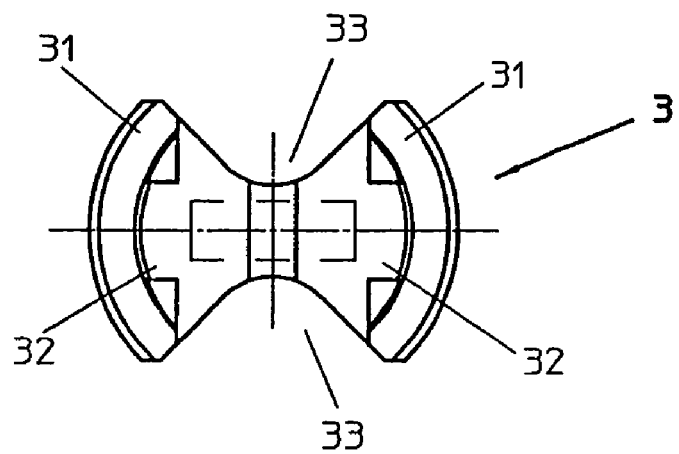
FIG. 21 shows a top view of the control disk shown in FIG. 19.
Figure 22:
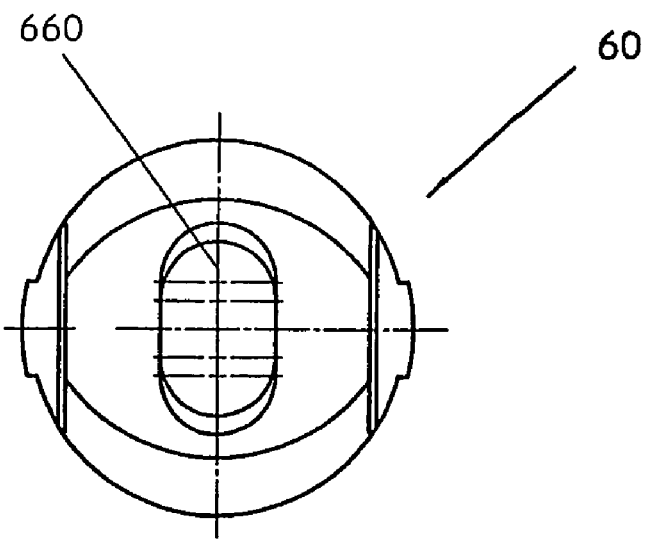
FIG. 22 shows a bottom view of a disk guide.
Figure 23:
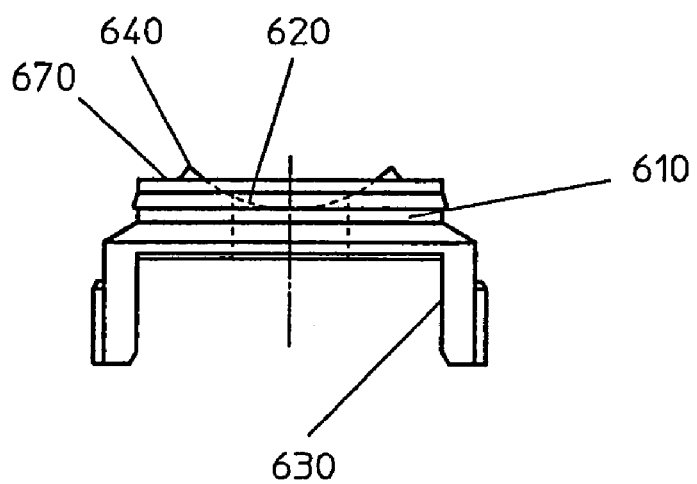
FIG. 23 shows a representation of a disk guide in axial cross-section.
Figure 24:
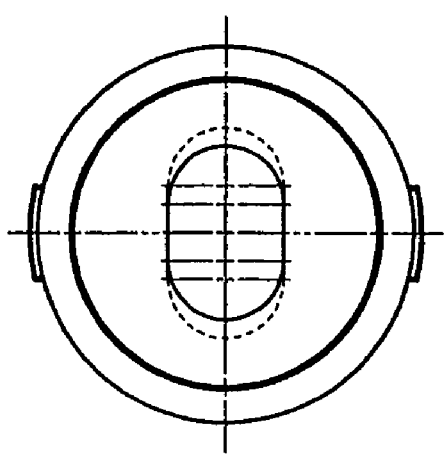
FIG. 24 shows a top view of the disk guide shown in FIG. 22.
Figure 25:
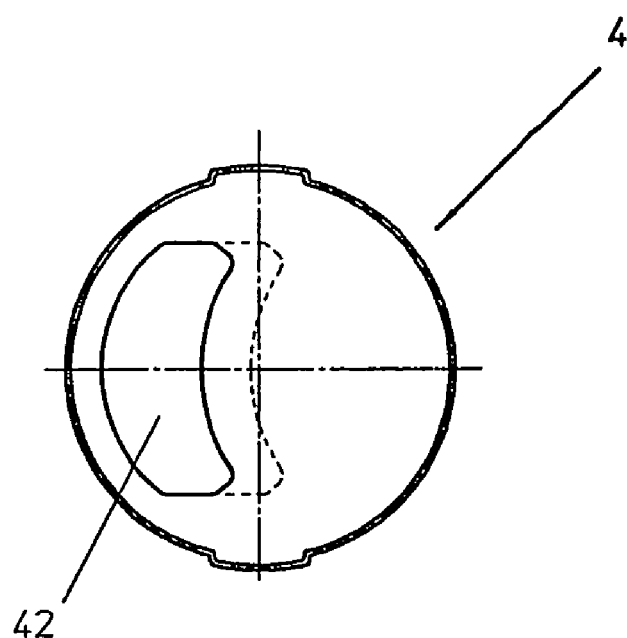
FIG. 25 shows a bottom view of an inlet disk.
Figure 26:
FIG. 26 shows a representation of an inlet disk, partially in a side view, partially in axial cross-section.
Figure 27:
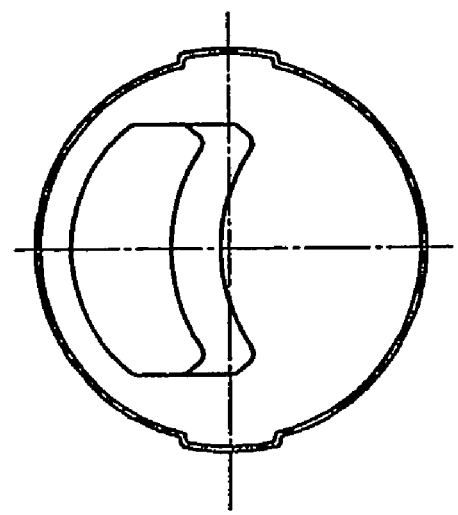
FIG. 27 shows a top view of the inlet disk shown in FIG. 25.
Figure 28:
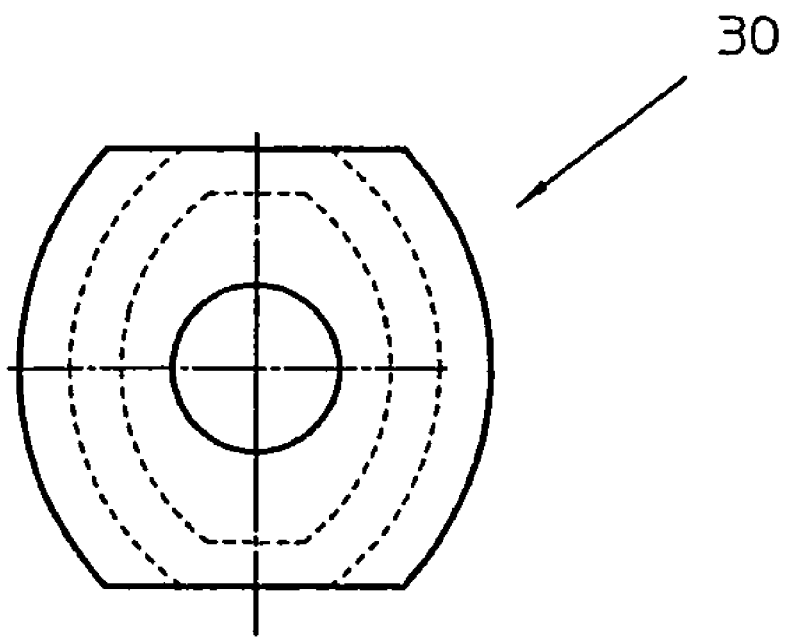
FIG. 28 shows a top view of a control disk in another embodiment.
Figure 29:
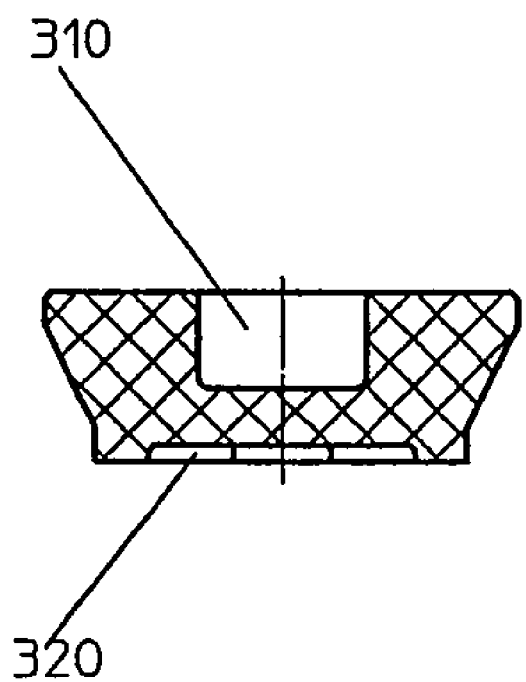
FIG. 29 shows a cross-sectional view of the control disk shown in FIG. 28.

Control disk 3 has an essentially barrel-shaped configuration, from which two arc segments 33 that lie opposite one another have been taken out (FIGS. 19 and 21). Arc segments 33 have an angle of approximately 90 in the exemplary embodiment. On its side facing spindle 2, control disk 3 has a ring-shaped joined-on piece 31. Ring-shaped joined-on piece 31 surrounds the driver 29 of spindle 2 in the assembled state. At the foot of joined-on piece 31, recesses 32 are formed, into which driver 29 engages. On the face facing away from spindle 2, two sector-shaped depressions 35 that lie opposite one another are provided in control disk 3.

Inlet disk 4 has two noses (not shown) that lie diametrically opposite one another, on its circumference. With the noses, disk 4 engages into the recesses that are provided in the sleeve-shaped part 19 of head piece 1. Inlet disk 4 is thereby disposed in head piece 1 so that it cannot rotate. Disk 4 has sector-shaped passage openings. In the exemplary embodiment, two passage openings that lie diametrically opposite one another are provided.

Seal 5 is configured in the manner of a lip seal. It consists essentially of a center piece 51, on which a lip 52 is formed on its face that faces disk 4. Lip 52 has an essentially trapezoid configuration in cross-section. Lip 52 is disposed at an angle to the horizontal. The outer surface of lip 52 lies against disk 4, forming a seal (FIG. 1). Lip 52, a ring 53 is disposed between the latter and center piece 51. Center piece 51 is provided with a collar 54 on the outside, which engages into the relieved region 18 of sleeve-like part 19. On the inside, a bead 55 is formed on center piece 51. In the assembled state of the upper valve part, the outside of bead 55 lies flat on the valve seat of the fitting.

Figure 2:
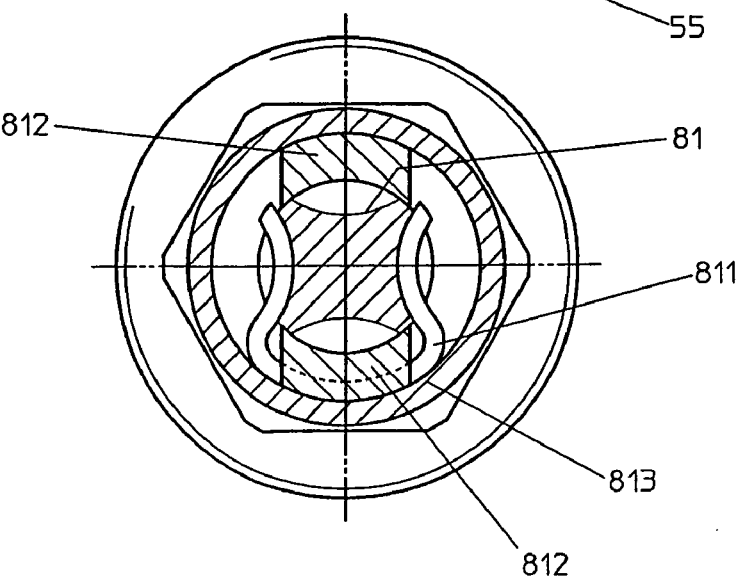
FIG. 2 shows the section along the line II-II in FIG. 1.
Figure 3:
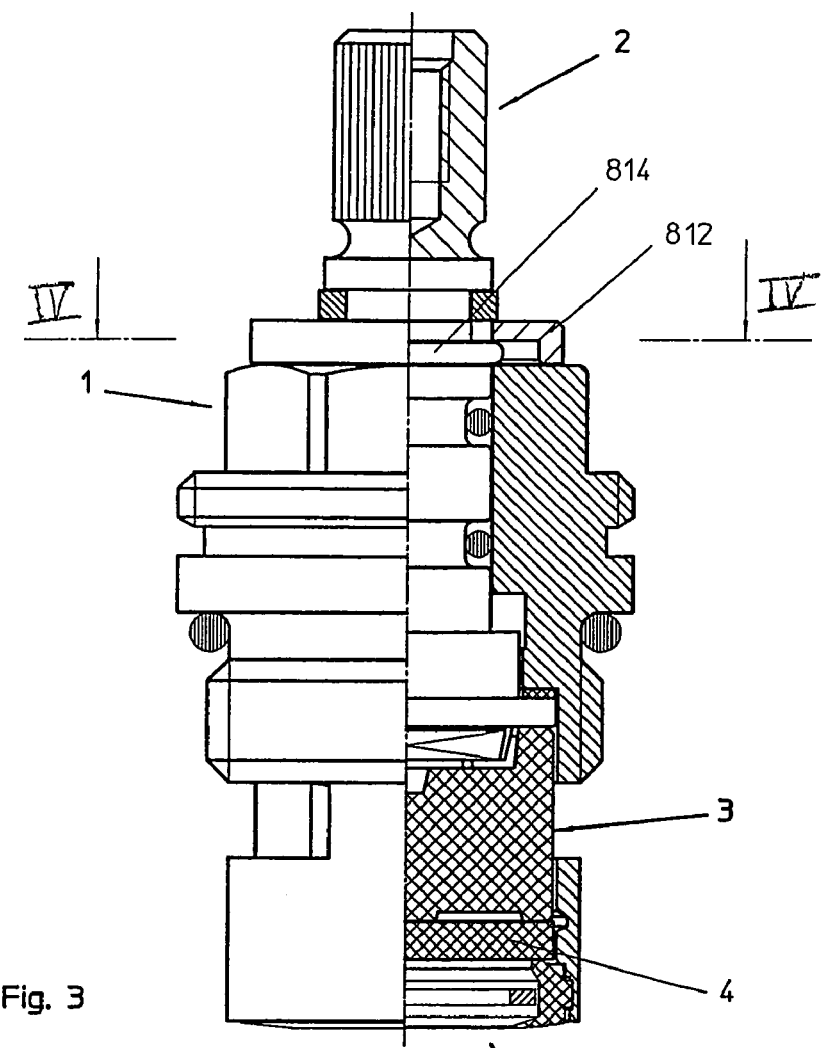
FIG. 3 shows in an enlarged representation, an upper valve part, partially in a side view, partially in axial cross-section, in another embodiment.
Figure 4:
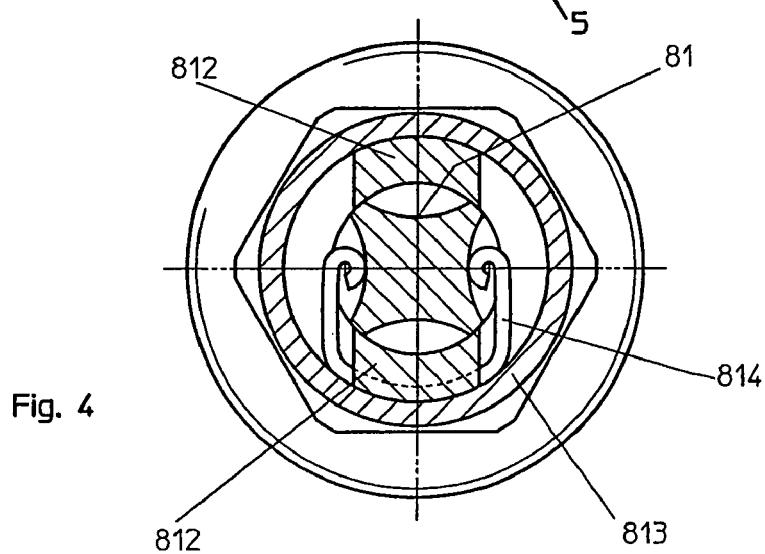
FIG. 4 shows the section along the line IV-IV in FIG. 3.

In the embodiment according to FIGS. 1 to 4, locking device 8 is configured between ring groove 24 and the recess 26. It comprises a spherical shell 81 that is configured in spindle 2 (FIGS. 2 and 4). The spherical shell 81 is surrounded by a spring wire 811, 814 on two opposite sides. Spring wire 811, 814 has an approximately U-shaped configuration. In the case of spring wire 811, the two shanks that lie opposite one another are configured to be drawn in, so that they are configured adapted to spherical shell 81 in their shape, and rest against it under the influence of the spring bias. In the case of spring wire 814, the free ends of the two parallel shanks are configured to be rolled in at their free ends, facing one another. The rolled-in ends lie against spherical shell 81 under the influence of the spring bias.

The crosspiece of spring wires 811, 814 that is formed between the shanks is held by a spring locking crosspiece 812 that is provided on the face end of head piece 1. The spring locking crosspiece 812 results in captive attachment of spring wires 811, 814 on the upper valve part. In the embodiments according to FIGS. 1 to 4, locking device 8 is covered by a disk 813 that stands in contact with shaft securing device 94 and is held clamped between the latter and the outermost end of head piece 1.

Figure 5:
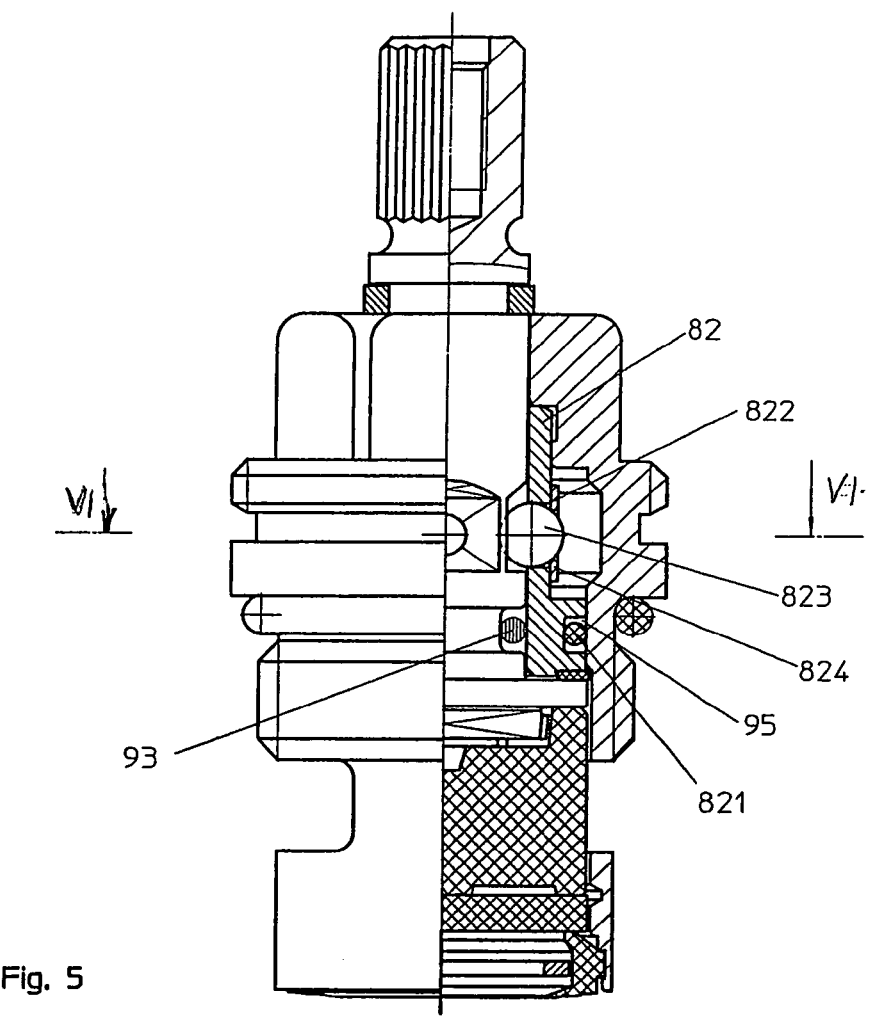
FIG. 5 shows in an enlarged representation, an upper valve part, partially in a side view, partially in axial cross-section, in another embodiment.
Figure 6:
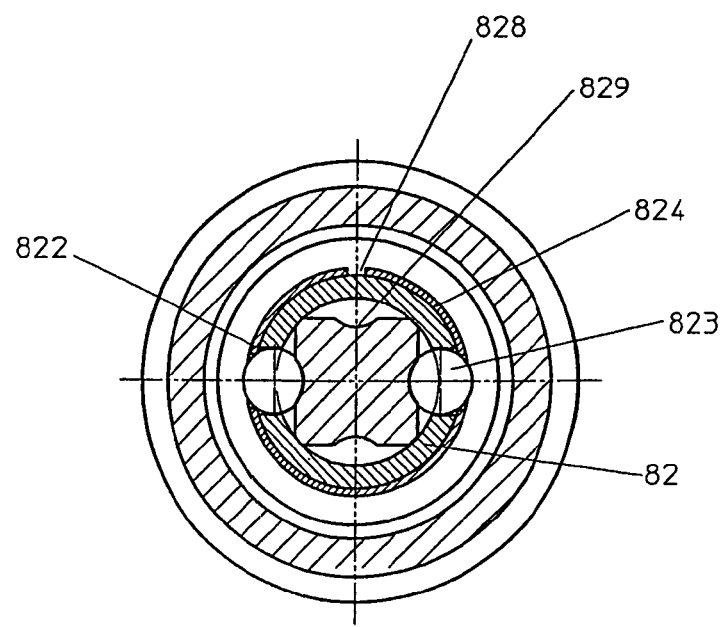
FIG. 6 shows the section along the line VI-VI in FIG. 5.

In the embodiment according to FIGS. 5 and 6, the locking device is disposed in head piece 1. In this connection, spindle 2 is surrounded by a positive-lock rotation prevention device 82, approximately in the region of the additional outside thread 17 of head piece 1. Rotation prevention device 82 is sealed off with an O-ring 95 that is disposed in a ring groove 821, relative to head piece 1, at its end that faces seal ring 5. On the inside, rotation prevention device 82 is sealed by means of O-ring 93 provided in ring groove 25. This configuration is particularly suitable for upper valve parts for fat chambers. Rotation prevention device 82 is furthermore provided with two bores 822, which each serve for passage of a ball 823. Balls 823 stand in contact with a spherical shell 829. On the outside, balls 823 are held by a spring ring 824, which has bores 825 through which balls 823 project, in certain sections. Spring ring 824 is provided with an expansion gap 828. To secure the movement possibility of balls 823, a circumferential groove is provided on the inside in head piece 1, which has a channel-shaped groove base.

Figure 7:
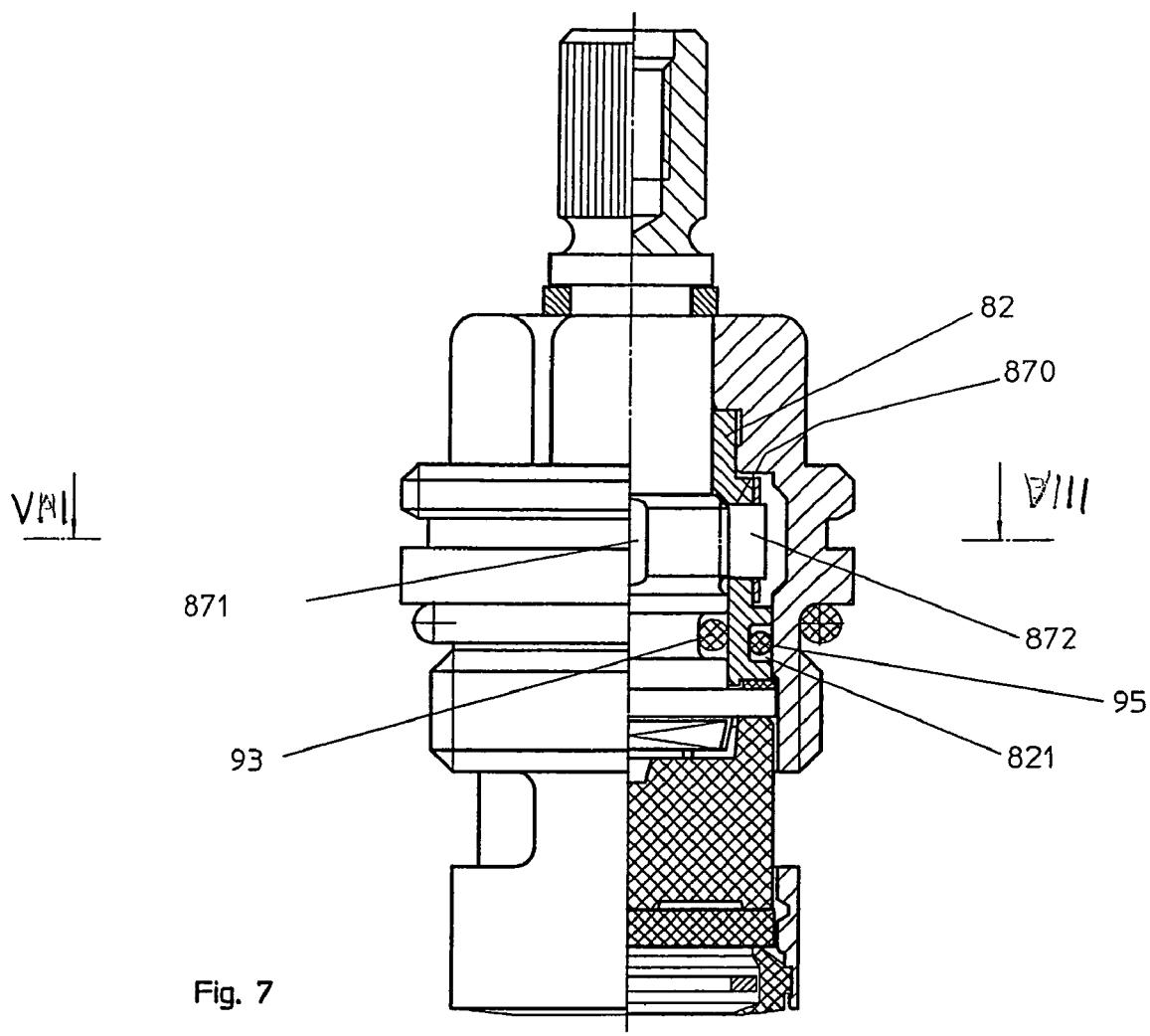
FIG. 7 shows in an enlarged representation, an upper valve part, partially in a side view, partially in axial cross-section, in another embodiment.
Figure 8:
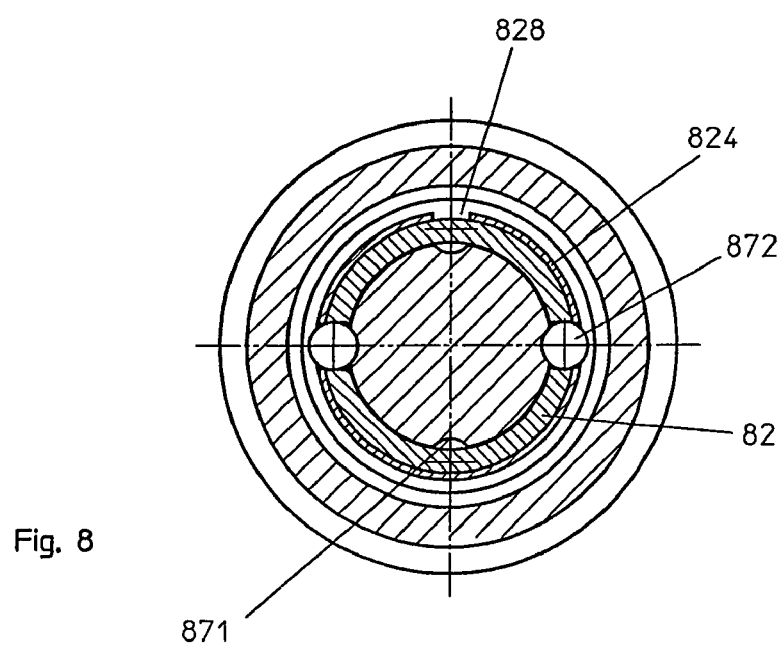
FIG. 8 shows the section along the line VIII-VIII in FIG. 7.
Figure 9:
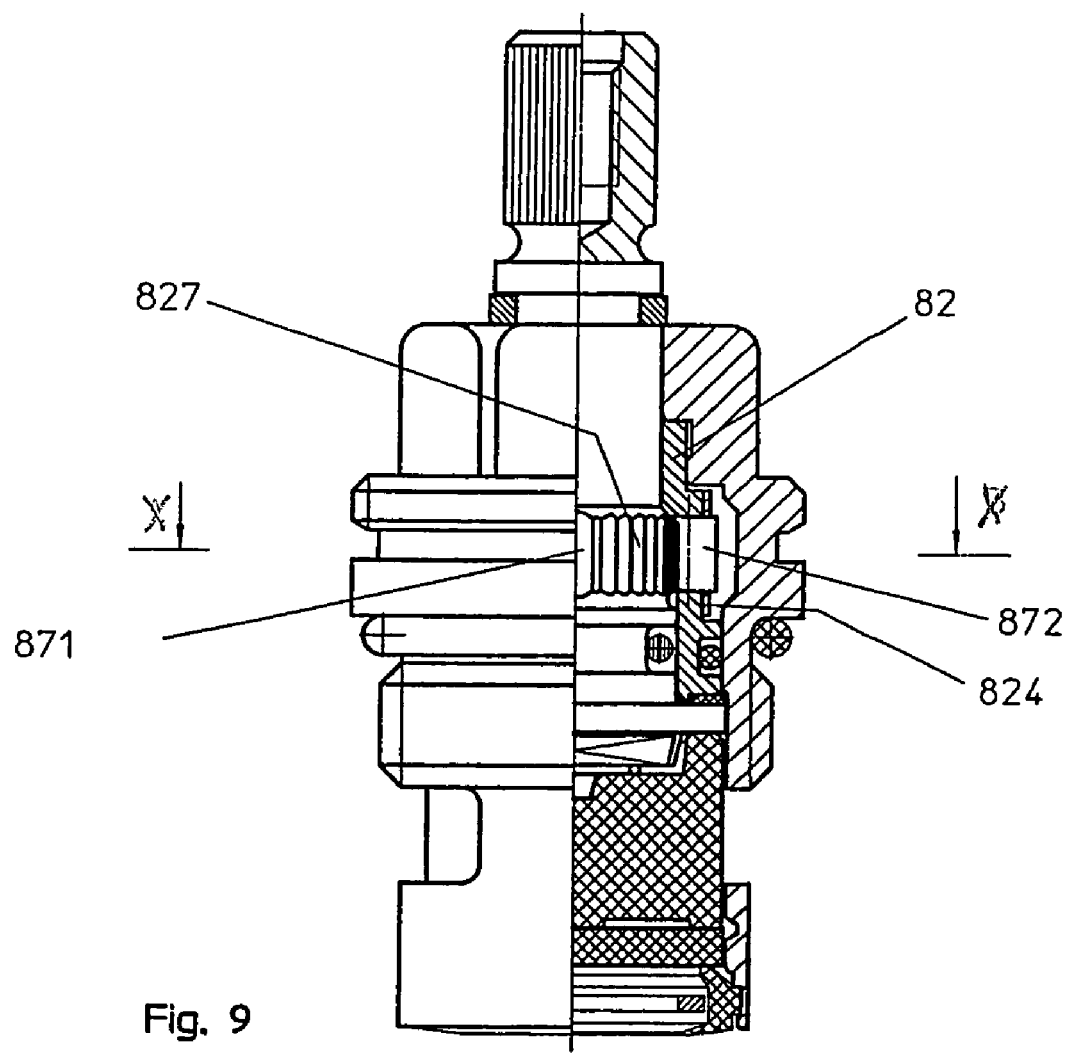
FIG. 9 shows in an enlarged representation, an upper valve part, partially in a side view, partially in axial cross-section, in another embodiment.
Figure 10:
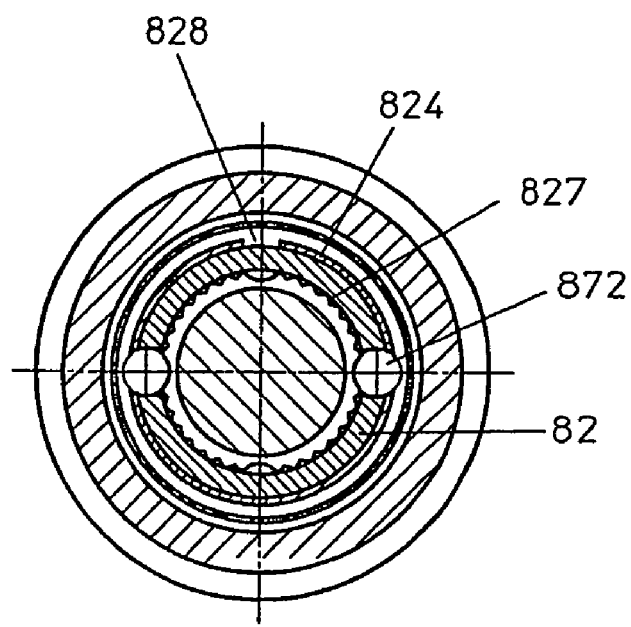
FIG. 10 shows the section along the line X-X in FIG. 9.

The embodiment according to FIGS. 7 and 8 is configured in essentially comparable manner to the embodiment according to FIGS. 5 and 6. The only difference is that the circumferential groove as well as the spherical shell 829 have been eliminated. Also, instead of balls, cylinder rollers 872 are used, which are held in passage openings 870 by rotation prevention device 82 and lie in a depression 871 in the spindle 2. They are held in the depression by spring ring 824. The embodiment according to FIGS. 9 and 10 is also provided with rollers 872. In contrast to the embodiment according to FIGS. 7 and 8, however, there is not only a depression, but also a ring surface 827 configured in the manner of a polygon is provided. Ring surface 827 consequently takes on the function of a grating.

Figure 11:
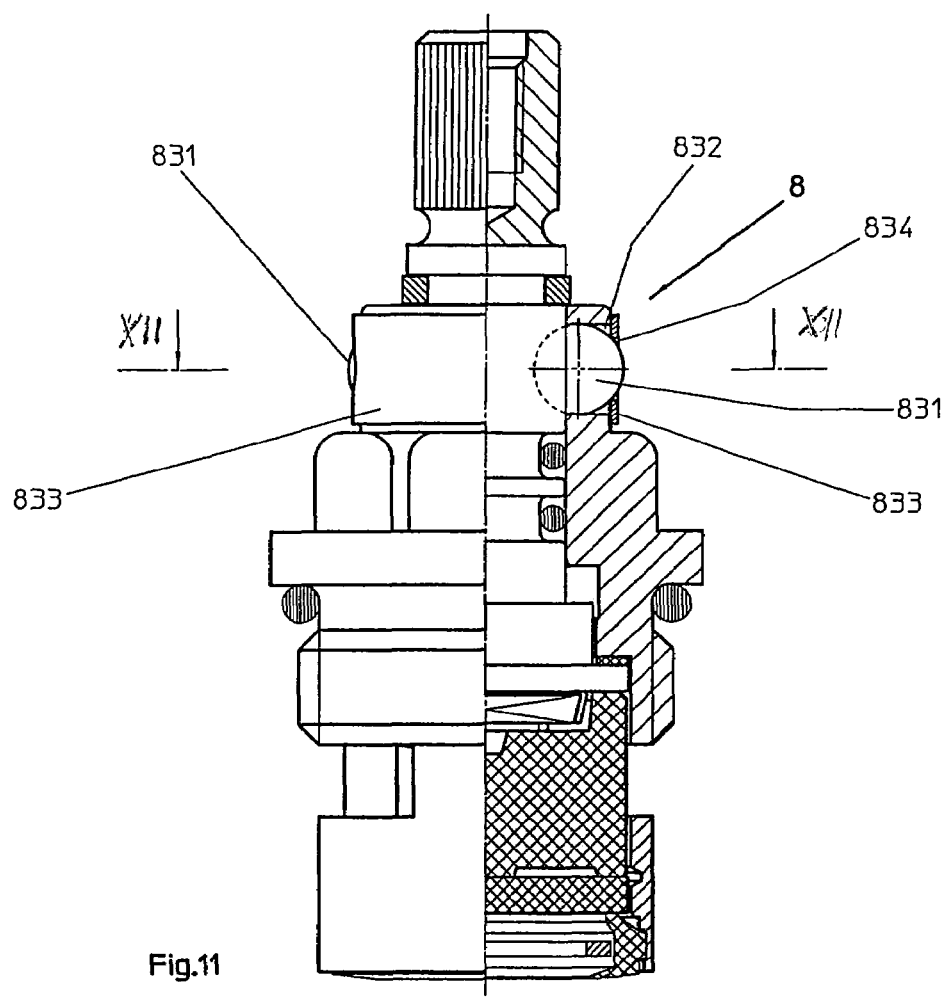
FIG. 11 shows in an enlarged representation, an upper valve part, partially in a side view, partially in axial cross-section, in another embodiment.
Figure 12:
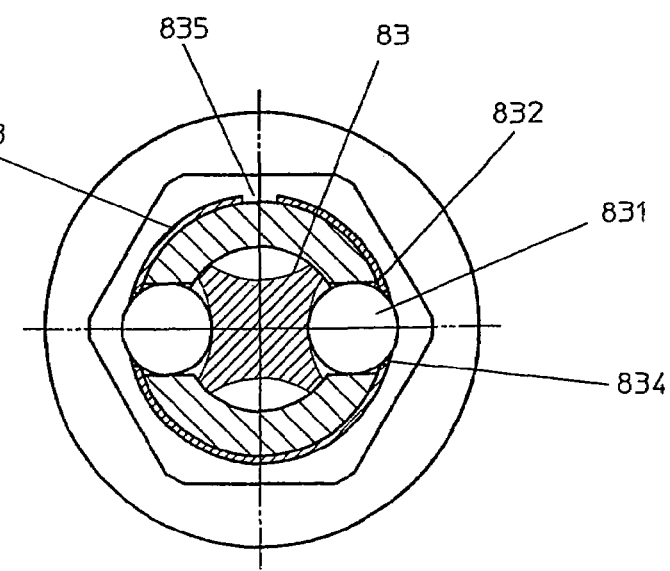
FIG. 12 shows the section along the line XII-XII in FIG. 11.

In the embodiment according to FIGS. 11 and 12, locking device 8 is provided in the region of the upper valve part that faces away from seal ring 5, on the outside of head piece 1, in comparable manner to the exemplary embodiment according to FIGS. 1 to 4. It has a spherical shell 83 that is configured in the spindle 2. In the exemplary embodiment, two balls 831 that are disposed in radial bores 832 provided in head piece 1 project into the spherical shell 83. Around the bores, a ring-shaped spring 833 is disposed, which has two openings 834 for partial passage of the balls 831. Spring 833 furthermore has an expansion gap 835.

In the following, the structure of the upper valve parts according to FIGS. 13 to 18 will be explained using the exemplary embodiment according to FIGS. 13 and 14, whereby there will be no further discussion of components that are the same as in the exemplary embodiments already described. The same reference symbols are used for these same components.

In the embodiments according to FIGS. 13 to 18, the inside diameter of head piece 10 is reduced on the side facing the fitting, following passage window 11, and continued at this lesser diameter. The step formed in this manner is configured as a bevel 110. Furthermore, following the progression of the head piece, a step 120 is provided, followed by an increasing narrowing in diameter in the form of a spherical segment 130. The spherical segment 130 runs out perpendicular on its side facing the fitting. On its side facing away from the fitting, the spherical segment 130 opens into an oblong hole 140 that narrows conically in the direction of the fitting. On the side of the head piece 10 that faces the fitting, a ring groove 160 is made, which serves to accommodate an O-ring 96. On the outside, the diameter of the head piece is configured to narrow towards the inside diameter, by way of a bevel 170, following window 11. Bevel 170 is followed by a cylinder 180, on which an outside thread 190 is disposed at the end facing away from the fitting. Between bevel 170 and outside thread 190, a seal groove 150 for accommodating an O-ring 97 is made in the cylinder 180, which ring seals the cap sleeve 70 relative to the head piece.

Spindle 20 is configured to be essentially solid. On its face that faces away from the fitting, it is also configured as an outside polygon 210 on the outside, which serves to accommodate a turning and pivoting handle, not shown. Following that, a cylinder surface 220 is provided on the outside of spindle 20, with which the spindle 20 passes through bore 140 and thereby comes to a stop. Cylinder surface 220 is followed by a ball-shaped section 230, followed by another cylinder surface 240. Spindle end 250 is configured in ball shape. Ball-shaped section 230 corresponds to spherical section 130 of the head piece.

Control disk 30 has an essentially ellipsoid outer contour, which is shortened orthogonal to the longitudinal center axis at its longitudinal ends, thereby bringing about two side surfaces that are parallel to one another. Control disk 30, a dead-end bore 310 is made in the center, the diameter of which is somewhat greater than the diameter of ball-shaped end piece 250 of the spindle 20. In the assembled state, end piece 250 engages in dead-end bore 310. On the side of the control disk 30 that lies opposite dead-end bore 310, a depression 320 is made, which has a shape comparable to the outer contour of control disk 30.

Inlet disk 40 has two guide noses that lie diametrically opposite one another on its circumference. The guide noses engage into guide grooves of sleeve-shaped part 19 of the head piece. Inlet disk 40 is thereby disposed in the head piece so as not to rotate. A passage opening 42 is made in inlet disk 40, which opening has an approximately sickle-shaped contour and whose mirror axis of symmetry lies on the orthogonal to the connection axis of the guide noses.

Disk guide 60 consists of a cylindrical base body 610 that has a guide plate 630 on its side facing the fitting. A spindle guide 660 is made in base body 610, along its axis of rotation, which guide is configured in the shape of an oblong hole. The length of the oblong hole increases in the direction of the fitting, along the axis of rotation of the cylindrical base body. The spindle guide 660 is consequently configured essentially in conical shape. At its end that faces away from the fitting, spindle guide 660 is provided with a ball accommodation 620. The ball accommodation 620 is configured as a countersunk bore, the diameter of which is greater than the length of the oblong hole on the side facing away from the fitting. The edge of the countersunk bore is configured in the shape of a piled bevel 640 on the cylindrical base body 610, the outside diameter of which is reduced as compared with the outside diameter of the cylindrical base body 610. The ring-shaped surface 670 between bevel 640 of ball accommodation 620 and the outside edge of the cylindrical base body 610 which is formed thereby serves to accommodate an O-ring 98 that seals the ball-shaped section 230 of the spindle 20, which rests in ball accommodation 620, relative to the disk guide 60 as well as relative to the head piece. O-ring 98 is held by a disk 981.

Cap sleeve 70 has a threaded piece 710 followed by an outside hexagon 720. A seal groove 730 for accommodating an 0-ring 99 is provided between threaded piece 710 and the outside hexagon 720. O-ring 99 seals the upper valve part, which is screwed to the fitting using cap sleeve 70, relative to the fitting. The inside diameter of cap sleeve 70 corresponds to the outside diameter of cylinder 180. At its end that faces the fitting, cap sleeve 70 is provided, on the inside, with a bevel 750, which corresponds to bevel 170 of the head piece in the assembled state of the upper valve part. Fixation of the upper part in the fitting takes place by means of a counter-nut 760, which can be screwed onto the outside thread 190 of the head piece.

The upper valve parts according to the embodiments of FIGS. 13 to 18 have locking device 8 in the region of outside thread 190, in each instance. In the exemplary embodiment according to FIGS. 13 and 14, locking device 8 is formed by a spring clamp 84. Spring clamp 84 extends essentially along oblong hole 140. At its two faces 841, the contour of the spring clamp corresponds to the outside contour of the head piece. Faces 841 engage into a circumferential groove 842, in which the clamp is securely held. The spring clamp 84 is configured drawn in, in the middle, in the top view, and projects beyond oblong hole 140 of the head piece with the indentations 843 formed thereby. Indentations 843 are in contact with spindle 20.

Figure 15:
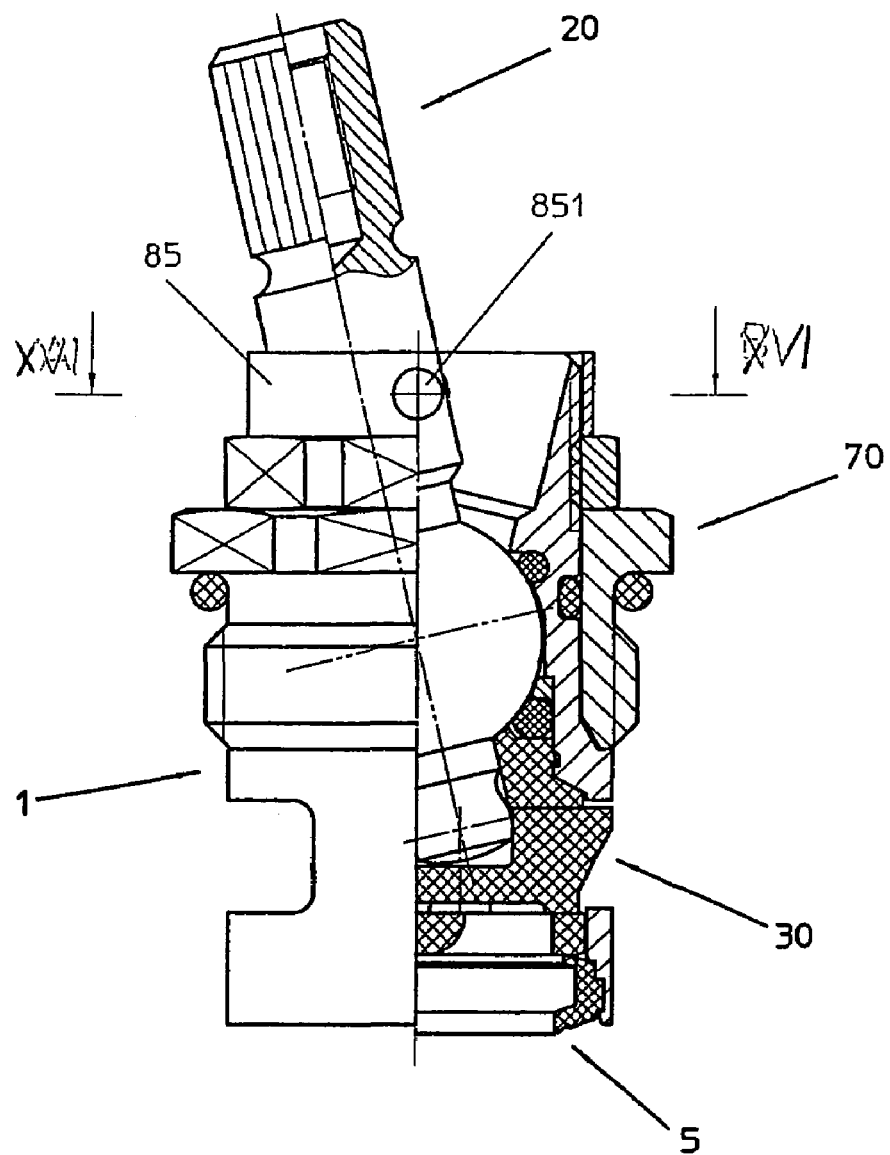
FIG. 15 shows in an enlarged representation, an upper valve part, partially in a side view, partially in axial cross-section, in another embodiment.
Figure 16:
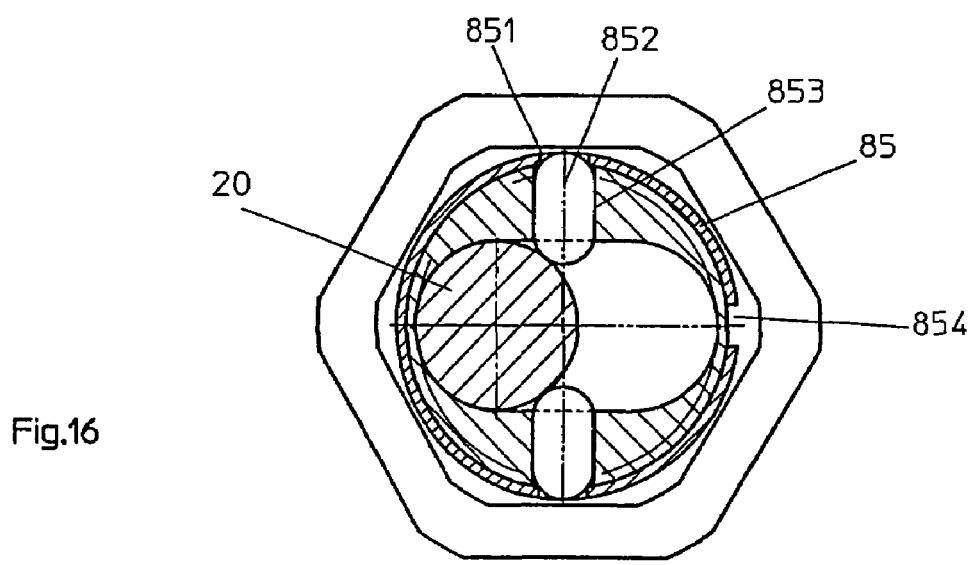
FIG. 16 shows the section along the line XVI-XVI in FIG. 15.

In the exemplary embodiment according to FIGS. 15 and 16, a spring ring 85 is disposed around outside thread 190. The spring ring 85 has two bores 851 that lie opposite one another, into which two ball pins 852 project in sections. With their ends that face away from bores 851, ball pins 852 project beyond oblong hole 140 of the head piece and stand in contact with spindle 20 with these. Ball pins 852 are guided in bores 853 that are disposed at a right angle to oblong hole 140 in the head piece.

Spring ring 85 is provided with a continuous expansion gap 854, offset by 90° to the bores 851.

Figure 17:
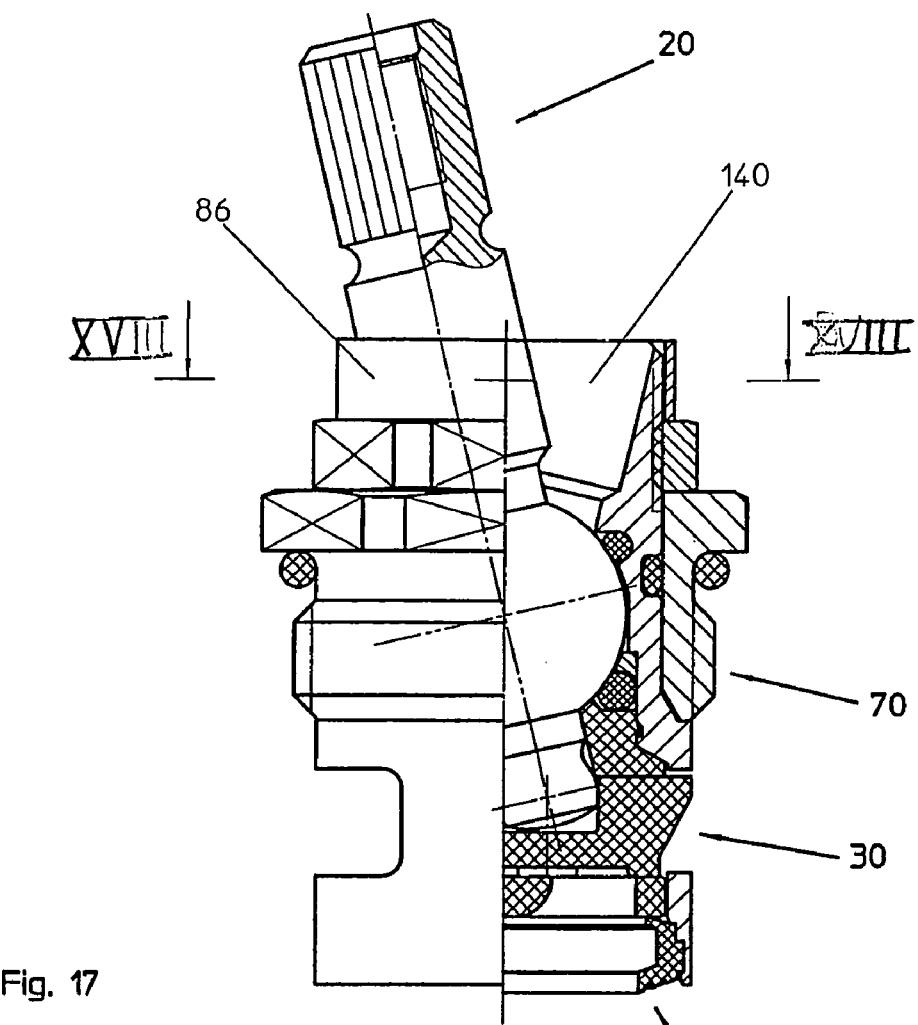
FIG. 17 shows in an enlarged representation, an upper valve part, partially in a side view, partially in axial cross-section, in another embodiment.
Figure 18:
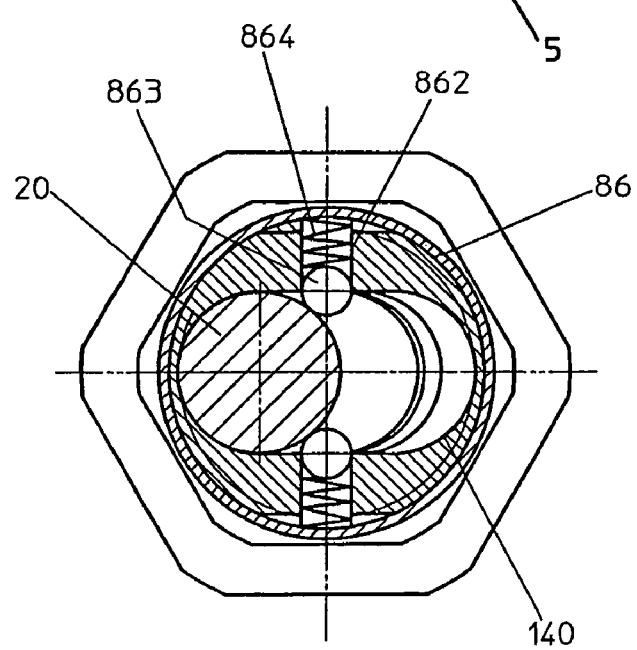
FIG. 18 shows the section along the line XVIII-XVIII in FIG. 17.

In the embodiment according to FIGS. 17 and 18, locking device 8 is disposed around outside thread 190 in the form of a ring 86, on the side of the head piece that faces away from the fitting. In the head piece, two bores 862 oriented at a right angle to oblong hole 140 are provided. Balls 863, for one thing, and spring 864, for another, are inserted into bores 862. Under the influence of spring 864, balls 863 project into the oblong hole 140, in sections, and stand in contact with spindle 20 with their sides that face away from springs 864.

Using locking device 8, locking of the spindle either in the position "completely open" or in the position "completely closed" is brought about on the upper valve parts, in each instance. Under the influence of the spring force acting on the spindle, it is guaranteed that the spindle cannot assume any permanent intermediate position. All of the exemplary embodiments have in common that a movement of the spindle results in spreading of the spring element, in each instance, formed by the spring wires 811, 814, spring rings 824, 85, spring 833, 864, and spring clamp 84. For this purpose, application of a force is required. When the greatest resistance brought about by the spring elements has been overcome, the spindle subsequently moves into the position opposite the starting position.

In this connection, the greatest force must be applied in the case of the exemplary according to FIGS. 1 to 6 as well as 11 and 12, in overcoming the "peaks" of spherical shell 81 and 83, respectively, in each instance. In the case of the exemplary according to FIGS. 1 to 4, the shanks of the spring wire are spread for this purpose, in order to allow turning of the spindle with spherical shell 81. In the embodiment according to FIGS. 5 and 6, spreading of spring ring 824 takes place. This is brought about by the required overcoming of the "peaks" of the spherical shell by balls 823. In this connection, balls 823 exit from the bores 822, counter to the resistance of spring ring 824. Expansion of the spring ring 823 is possible due to expansion gap 828. Activation of the upper valve part according to the exemplary embodiment of FIGS. 7 and 8 takes place in comparable manner. In this connection, it is necessary for rollers 872 to leave the depression 871 to activate the spindle. This takes place counter to the force of spring ring 824.

Figure 13:
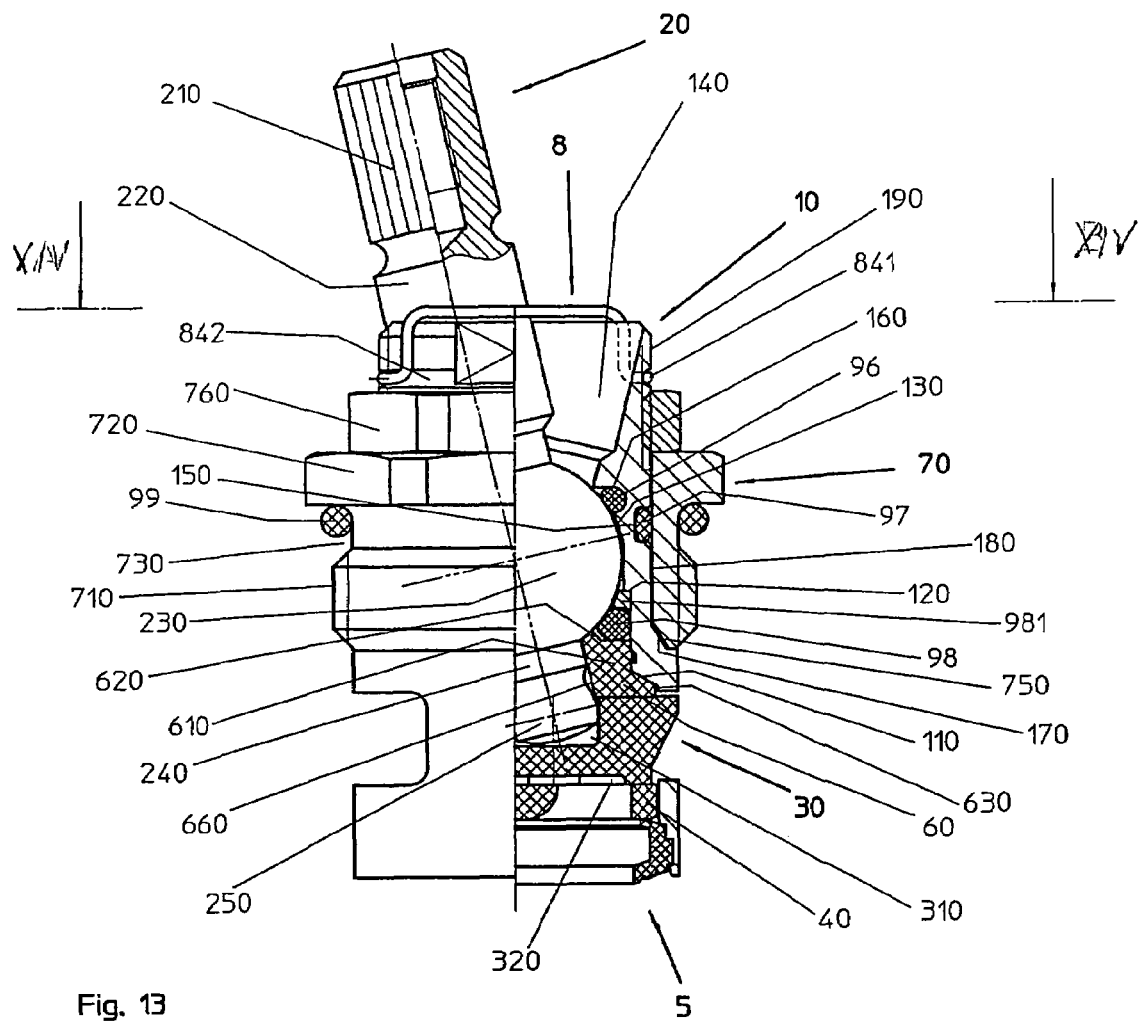
FIG. 13 shows in an enlarged representation, an upper valve part, partially in a side view, partially in axial cross-section, in another embodiment.
Figure 14:
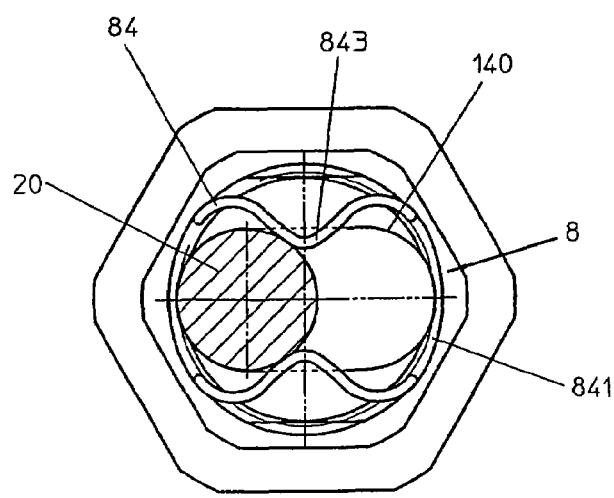
FIG. 14 shows the section along the line XIV-XIV in FIG. 13.

In the embodiment according to FIGS. 13 and 14, it is necessary to overcome indentation 843 of spring clamp 84 in order to activate spindle 20. In the case of activation of the spindle, spring clamp 84 is spread in the region of indentation 843. After having passed by indentation 843, spindle 20 moves into the other of the two positions. In the case of the embodiments according to FIGS. 15 to 18, activation of spindle 20 is only possible if the narrowing above oblong hole 140 formed by ball pins 852, or by the balls 863, respectively, has been passed. By means of activation of the spindle 20, balls pins 852 or balls 863, respectively, are pressed outwards counter to the spring force that acts on them, so that it is possible for spindle 20 to pass by the narrowed region.

With regard to the different embodiments of the locking device 8, it should be noted that the devices disposed in the region of the end facing away from the fitting of head piece 1, 10 are preferred, due to their simple assembly and the low design effort involved. The locking devices disposed in the head piece, on the other hand, offer advantages with regard to the risk of contamination. Furthermore, such a locking device is disposed in the upper valve part so that it is not visible.

In a variation of the embodiments presented, there is the possibility of replacing the balls or rollers used with pins or rods, and vice versa, if this is desired. Likewise, there is the possibility of replacing bores provided in the spring rings with oblong holes. The selection essentially takes place in coordination with the balls, rollers, or pins, respectively, that are used. Furthermore, in a variation of the embodiments presented, the locking device can be provided with an elastomer or with a spring band that is closed in itself, instead of with a spring ring.

The use of the spherical shells shown allows a 90° restriction between the completely open and the completely closed position of the upper valve part. In the case of the embodiments according to FIGS. 13 to 16, on the other hand, the angle by which the control disk 30 is turned in order to get from one position to the other depends on the geometry of the upper valve part, as a function of the number of spherical shells that have been worked into the spindle, and the number of balls or rollers, respectively. Here, different angles are possible, for example 90° or 180°, or even 360°.

Accordingly, while only a few embodiments of the present invention have been shown and described, it is obvious that many changes and modifications may be made thereunto without departing from the spirit and scope of the invention.

What is claimed is:

1. An upper valve part for fittings, comprising:
   a head piece;
   a solid spindle extending through and secured in the head piece so as to prevent axial displacement of the spindle in said head piece;
   a shut-off device connected to the spindle;
   a seal adapted to rest on the fitting; and
   a radially acting locking device for locking the valve part in an open position and in a closed position;
   wherein the shut-off device comprises a control disk, said control disk being displaceable through radial rotation or pivoting motion via the spindle relative to a fixed inlet disk forming a seal;
   wherein during displacement the control disk slides on the inlet disk to move from the open position to the closed position.

2. An upper valve part according to claim 1, wherein the locking device is disposed in the head piece.

3. An upper valve part according to claim 1, wherein the locking device is disposed in a region of an end of the head piece that faces away from the fitting.

4. An upper valve part according to claim 1, wherein the locking device comprises a spherical shell.

5. An upper valve part according to claim 1, further comprising a spring element in the form of a spring wire connected to the locking element.

6. An upper valve part according to claim 1, further comprising a spring element in the form of a spring ring connected to the locking element.

7. An upper valve part according to claim 6, wherein the spring ring has an expansion gap.

8. An upper valve part according to claim 1, wherein the locking device comprises a ring surface that is configured in the manner of a polygon.

9. An upper valve part according to claim 1, further comprising a spring element which is provided with an elastomer, said spring element being connected to the locking device.

10. An upper valve part according to claim 1, further comprising a spring element which is provided with a closed, resilient band, said spring element being connected to the locking device.

* * * * *